United States Patent [19]

Leifeld

[11] Patent Number: 5,630,251
[45] Date of Patent: May 20, 1997

[54] SLIVER GUIDE ASSEMBLY INCLUDING A SLIVER GUIDING DEVICE AND A SLIVER PREFORMER

[75] Inventor: Ferdinand Leifeld, Kempen, Germany

[73] Assignee: Trützschler GmbH & Co. KG, Mönchengladbach, Germany

[21] Appl. No.: 549,307

[22] Filed: Oct. 27, 1995

[30] Foreign Application Priority Data

Aug. 3, 1995 [DE] Germany ............... 195 28 484.4

[51] Int. Cl.$^6$ ........................... D01H 5/72
[52] U.S. Cl. .................. 19/291; 19/288; 19/239
[58] Field of Search ............... 19/0.23, 106 R, 19/236, 239, 240, 243, 287, 288, 291, 292, 150, 157

[56] References Cited

U.S. PATENT DOCUMENTS

| | | | |
|---|---|---|---|
| 2,683,290 | 7/1954 | Noguera | 19/287 |
| 4,259,766 | 4/1981 | Copoulos . | |
| 4,630,336 | 12/1986 | Schopwinkel et al. | 19/288 |
| 5,379,488 | 1/1995 | Stahlecker | 19/287 |

FOREIGN PATENT DOCUMENTS

| | | |
|---|---|---|
| 0007373 | 3/1983 | European Pat. Off. . |
| 3722771 | 2/1989 | Germany . |
| 3807582 | 9/1989 | Germany . |
| 4124702 | 2/1992 | Germany . |
| 1425819 | 2/1976 | United Kingdom . |
| 2037339 | 7/1980 | United Kingdom . |
| 2106552 | 4/1983 | United Kingdom . |
| 2178074 | 2/1987 | United Kingdom . |
| 2277106 | 10/1994 | United Kingdom . |
| 87/04472 | 7/1987 | WIPO . |

*Primary Examiner*—Michael A. Neas
*Attorney, Agent, or Firm*—Spencer & Frank

[57] ABSTRACT

An apparatus for measuring sliver thickness in a drawing frame includes a sliver guiding device having converging inner wall faces for bringing a plurality of simultaneously introduced slivers together to form a sliver assembly constituted by side-by-side positioned running slivers arranged in a plane. The apparatus further includes a sensor element laterally contacting the sliver assembly; and a counterelement laterally contacting the sliver assembly. The counterelement is so supported that it may pivot parallel to the plane of the sliver assembly for purposes of adjustment and immobilization. The sensor element is urged into a resilient contact with the sliver assembly whereby the sensor element undergoes excursions upon variation of thickness of the sliver assembly. The sensor element and the counterelement together define a constriction through which the sliver assembly passes. A transducer converts excursions of the sensor element into electric pulses. A preformer adjoins the sliver guiding device upstream thereof for causing the slivers to laterally approach one another before they enter the sliver guiding device. The preformer has converging lateral wall components and an open top and/or bottom side. A withdrawing roller pair supported downstream of the sliver guiding device pulls the sliver assembly through the preformer and the sliver guiding device.

10 Claims, 4 Drawing Sheets

SLIVER GUIDE ASSEMBLY INCLUDING A SLIVER GUIDING DEVICE AND A SLIVER PREFORMER

CROSS REFERENCE TO RELATED APPLICATION

This application claims the priority of German application No. 195 28 484.4 filed Aug. 3, 1995.

BACKGROUND OF THE INVENTION

This invention relates to an apparatus for measuring the sliver thickness in a drawing frame, particularly in a regulated drawing frame. The apparatus includes a sliver guiding device for guiding a plurality of simultaneously inputted fiber slivers at the inlet of the drawing frame. At least parts of the inner wall faces of the guiding device converge such that the side-by-side running slivers are brought together to form a sliver assembly in which the slivers assume a side-by-side contacting relationship in a single plane. Downstream of the guiding device, as viewed in the direction of sliver run, a roller pair is arranged which defines a nip through which the sliver assembly passes. By virtue of the frictional engagement in the nip, the roller pair pulls the sliver assembly through the sliver guiding device. Downstream of the roller pair the slivers diverge from one another. The sliver guiding device is associated with a biased, movable sensor element which, together with an operationally stationary counterelement (wall element), constitutes a constriction for the throughgoing sliver assembly. The sensor element executes excursions as the thickness of the sliver assembly changes. The displacements of the sensor element are applied to a transducer which, in response, generates control pulses. The counterelement situated opposite the sensor element may be adjusted and immobilized in its adjusted position.

In a known apparatus of the above-outlined type two sliver guiding devices are connected in series. The simultaneously running slivers first enter the upstream-located, first sliver guiding device and are pre-densified thereby. The first sliver guiding device is at a small clearance from the downstream-located, second sliver guiding device, so that air may escape through the clearance. The clearance thus functions as an air vent. The first sliver guiding device—similarly to the second sliver guiding device—has two converging lateral surfaces, as well as top and bottom surfaces and—with the exception of inlet and outlet openings—is thus closed on all sides. In the first sliver guiding device the slivers are preformed into a sliver assembly which is pre-densified, while air is pressed out therefrom. By virtue of the fact that the top and bottom surfaces too, converge in the advancing direction of the sliver, the sliver assembly may not deflect upwardly or downwardly, but is forced through the outlet opening of the first sliver guiding device and compressed. The withdrawing roll pair has to pull the slivers through both sliver guiding devices.

SUMMARY OF THE INVENTION

It is an object of the invention to provide an improved apparatus of the above-outlined type in which the preforming of the slivers is ameliorated.

This object and others to become apparent as the specification progresses, are accomplished by the invention, according to which, briefly stated, the apparatus for measuring sliver thickness in a drawing frame includes a sliver guiding device having converging inner wall faces for bringing a plurality of simultaneously introduced slivers together to form a sliver assembly constituted by side-by-side positioned running slivers arranged in a plane. The apparatus further includes a sensor element laterally contacting the sliver assembly; and a counterelement laterally contacting the sliver assembly. The counterelement is so supported that it may pivot parallel to the plane of the sliver assembly for purposes of adjustment and immobilization. The sensor element is urged into a resilient contact with the sliver assembly whereby the sensor element undergoes excursions upon variation of thickness of the sliver assembly. The sensor element and the counterelement together define a constriction through which the sliver assembly passes. A transducer converts excursions of the sensor element into electric pulses. A preformer adjoins the sliver guiding device upstream thereof for causing the slivers to laterally approach one another before they enter the sliver guiding device. The preformer has converging sides and an open top and/or bottom side. A withdrawing roller pair supported downstream of the sliver guiding device pulls the sliver assembly through the preformer and the sliver guiding device.

By virtue of the fact that the preformer is void of top and/or bottom surfaces, that is, it is open at the top and/or at the bottom, the slivers are only gathered, brought together laterally and guided in the direction of the sliver guiding device. Thus, the slivers can deflect (expand) upwardly and/or downwardly, as a result of which the sliver assembly will be slightly thicker. The slivers are brought together essentially to such an extent that adjoining slivers are in contact with one another. At the same time, the side walls of the preformer guide the sliver assembly into the sliver guiding device in such a manner that the friction of the outermost slivers of the sliver assembly is reduced at the inner wall surfaces of the sliver guiding device. In the sliver guiding device the densification of the sliver assembly is greater laterally than in a vertical direction and the lateral thickness of the densified sliver assembly is sensed. The withdrawing roller pair needs only a slight force to pull the sliver assembly through the preformer.

BRIEF DESCRIPTION OF THE DRAWING

FIG. 1b is a sectional view taken along line Ib—Ib of FIG. 1a.

FIG. 2 is a schematic sectional top plan view of the construction shown in FIG. 1a.

FIG. 3 is a schematic side elevational view of a support for a preformer of FIG. 1a.

DESCRIPTION OF THE PREFERRED EMBODIMENTS

Figure 1A:
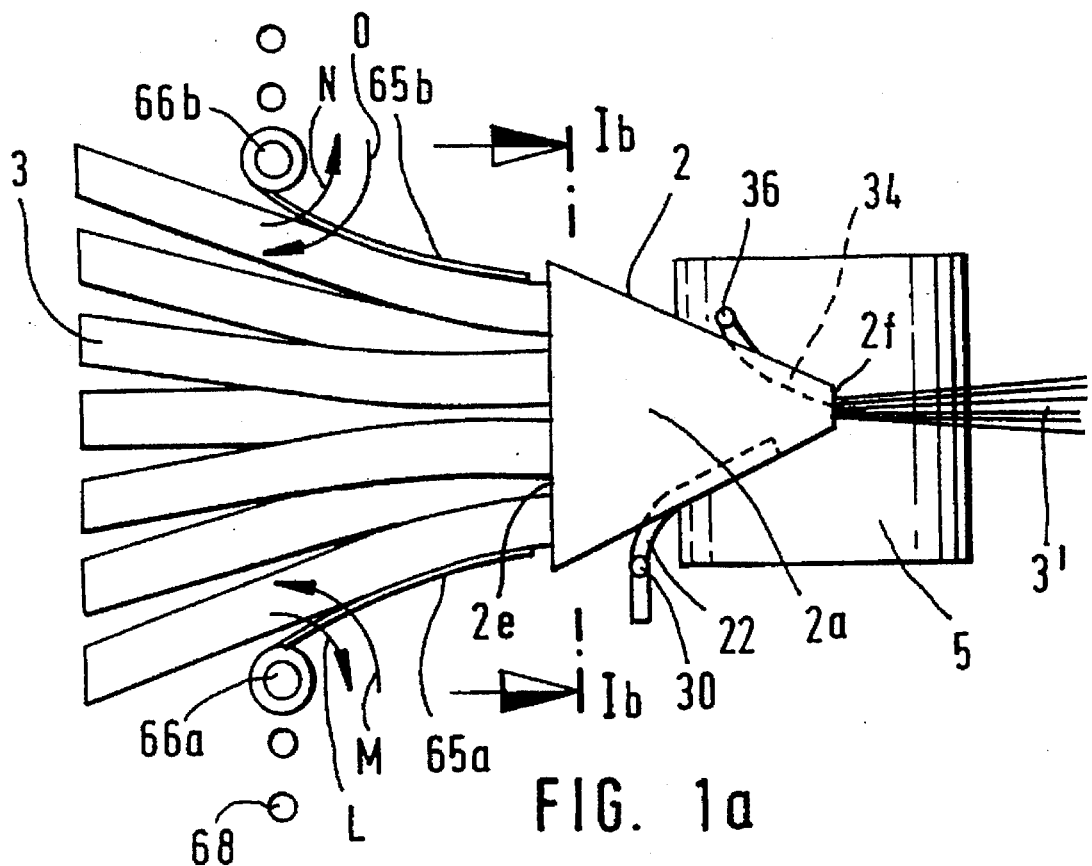
FIG. 1a is a schematic top plan view of the sliver guiding device, including a preformer according to the invention.

In FIG. 1a, a preforming device (preformer) 65 is arranged upstream of the sliver guiding device 2 to preliminarily guide the slivers 3 laterally towards one another before they enter the silver guiding device 2. The preforming device 65 has two lateral wall components 65a, 65b which curve in a convex manner towards one another. The preforming device 65 has no top or bottom wall, that is, it is upwardly and downwardly open. At their one end the wall components 65a, 65b are pivotal about a pivot 66a and 66b, respectively, in the direction of the arrows L, M and, respectively, N, O about respective vertical axes. The wall components 65a, 65b converge in the direction of the inlet opening of the sliver guiding device 2. The slivers leaving the withdrawing rollers 4 and 5 (the roller 4 is not shown for the sake of clarity) are designated at 3'.

Figure 1B:
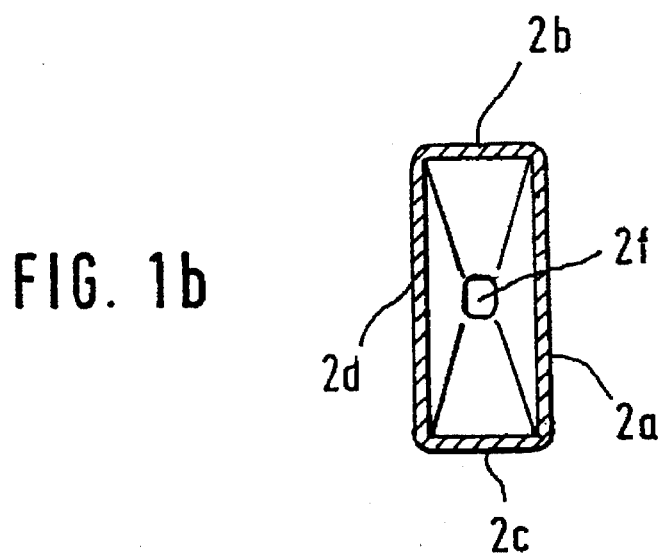

In FIG. 1b, the cross-sectional configuration of the guiding device 2 is shown as seen from the entrance side thereof. The sliver guiding device 2 has an upper wall 2a, two side walls 2b and 2c and a bottom wall 2d as well as an inlet opening 2e and an outlet opening 2f.

Figure 2:
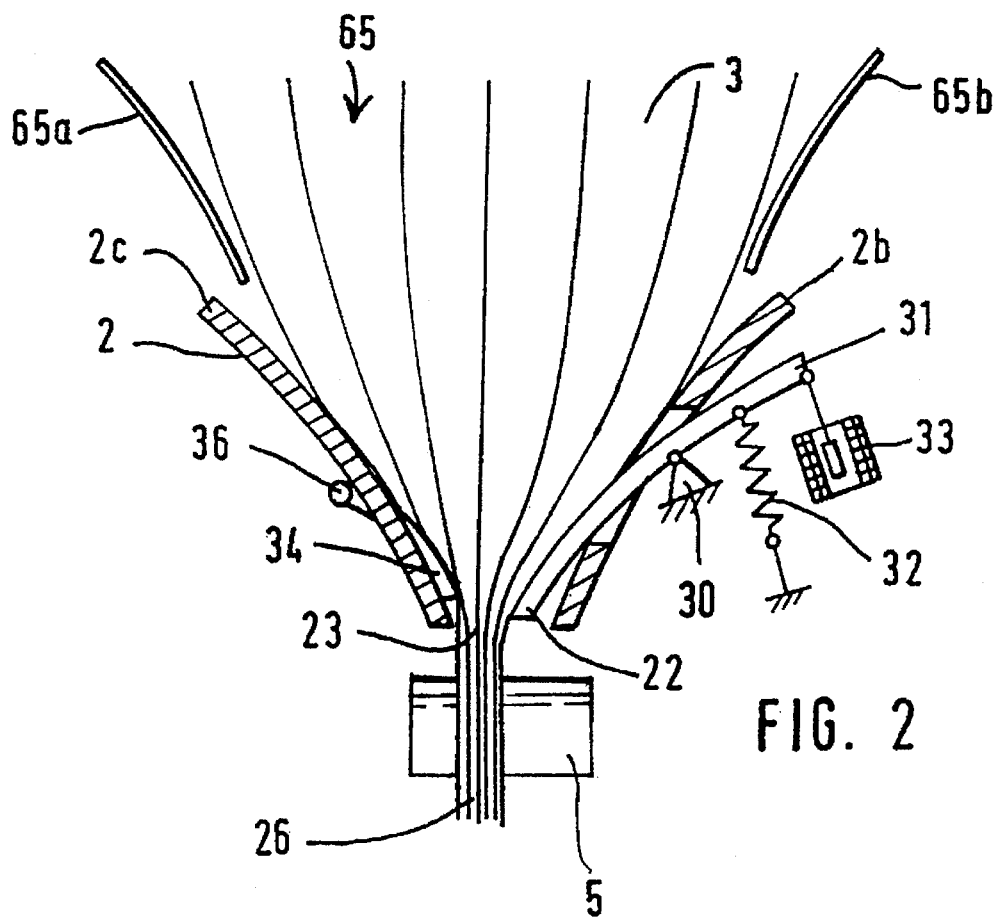
Figure 5:
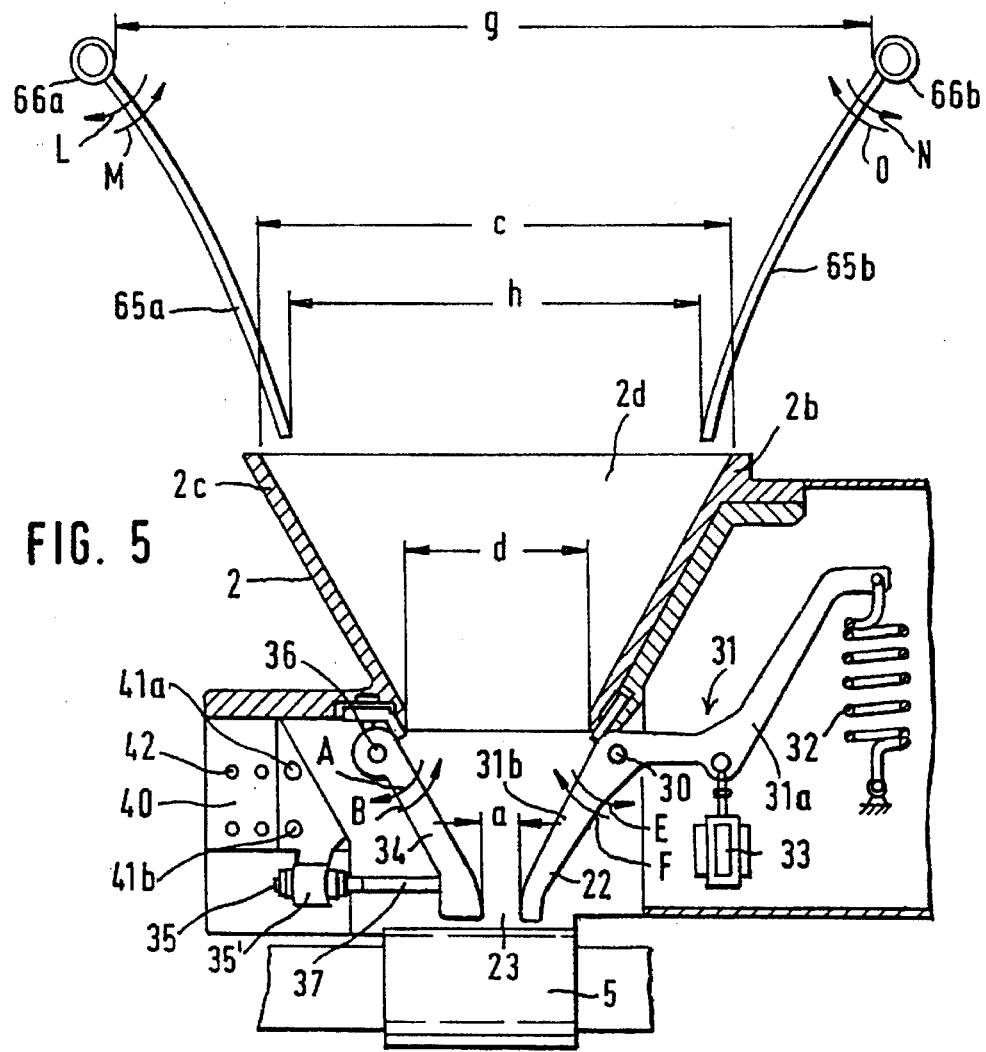
FIG. 5 is a schematic top plan view of a sliver guiding device, including a preformer according to the invention.

According to the arrangement shown in FIG. 2, the slivers 3 enter essentially separately into the inlet opening of the preformer 65 and, by virtue of the converging wall components 65a, 65b they are laterally brought together, as a result of which the slivers are in contact with the adjoining slivers and thus form a sliver assembly. The slivers 3 may slightly project upwardly or downwardly so that the sliver assembly is, in the vertical direction, slightly thicker than the thickness of the individual slivers 3. As seen in FIG. 5, the distance h between the wall components 65a, 65b at the outlet of the preformer 65 is less than the distance c of the side walls 2b, 2c at the inlet 2e of the sliver guiding device 2. In this manner, the sliver assembly is guided in such a manner that the friction of the laterally outermost slivers 3 against the inner faces of the side walls 2b, 2c is as small as possible. Such a guidance of the sliver assembly may be altered in a desired manner by virtue of the adjustability of the distance between the wall components faces 65a, 65b, as will be described below.

Figure 3:
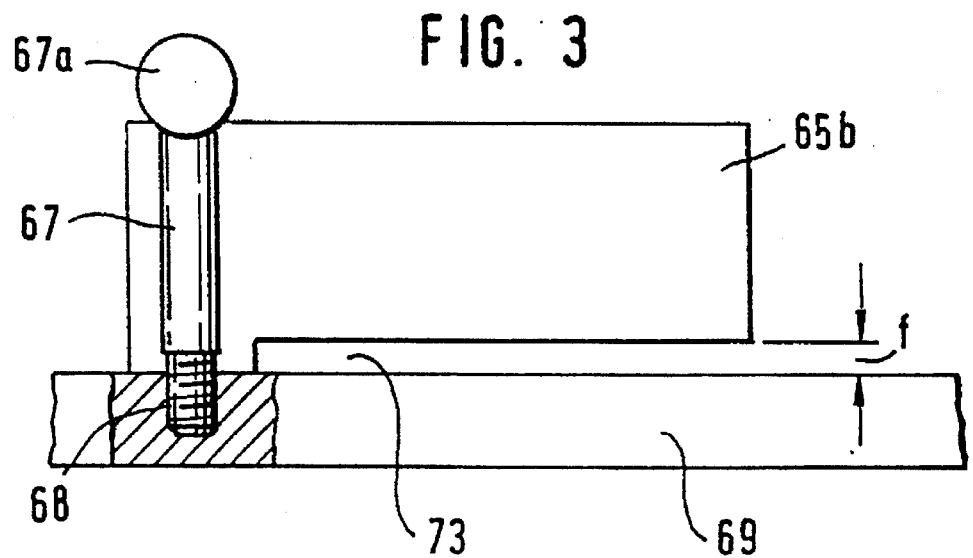

Turning to FIG. 3, the pivot 66b comprises a pin 67 which at one end is secured by a screw in a threaded hole 68 of a base plate 69. The pin 67 carries the wall component 65b. Between the lower edge of the wall component 65b and the base plate 69 by means of a cutout 73 a distance f is provided which prevents accumulation of fibers or the like. In the base plate 69 several holes 68 are provided (as shown in FIG. 1a) so that the pin 67 may be relocated. The head of the pin 67 presses against the wall component 65b which is thus immobilized in its position. The same type of pivotal structure may be provided for the wall component 65a.

Figure 4:
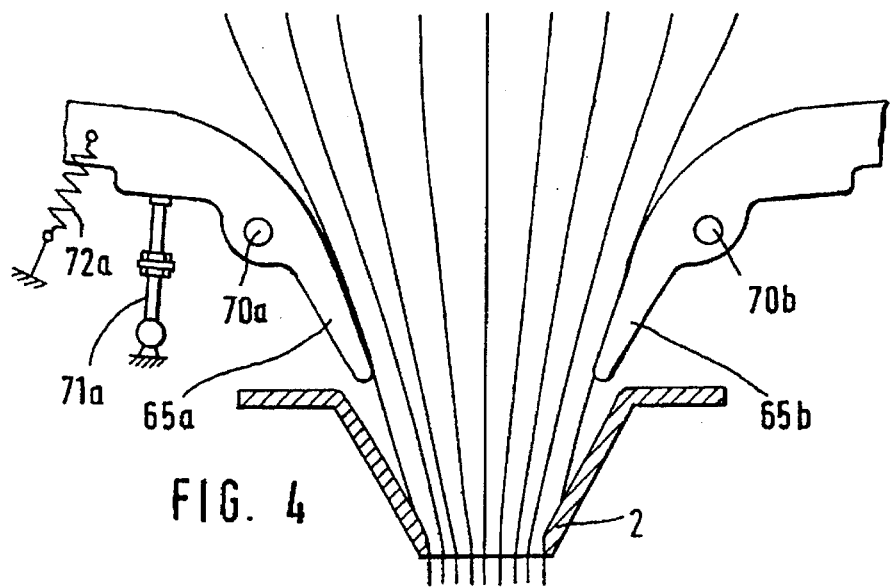
FIG. 4 is a schematic top plan view of a preferred embodiment of a preformer according to the invention.

In FIG. 4, the wall components 65a and 65b are formed as arcuate members rotatable about respective pivots 70a, 70b. At one end of, for example, the wall component 65aa setting member 71a, 71b, for example, a setscrew is engaged. Further, at the same end a tension spring 72a is arranged. Such an adjusting mechanism is duplicated for the wall component 65b.

Turning to FIG. 5, the apparatus according to the invention is shown with the preforming device 65 and the afterconnected sliver guide 2. The preforming device 65 has an inlet width g and an outlet width h. The preforming elements (wall components) 65a and 65b are swingably held by pivots 66a, 66b for swinging motion as indicated by the arrows L, M as well as N and O. The preforming device 65 is adjoined by the sliver guiding device 2 situated at the inlet of a drawing frame as will be further explained in conjunction with FIG. 6. The guiding device 2 has four walls (only walls 2b and 2c are visible in FIG. 5), of which at least two oppositely located walls 2b and 2c converge towards one another in the downstream direction, that is, in the sliver advancing direction. The sliver guiding device has an inlet width c and an outlet width d. The walls of the sliver guiding device 2 cause the slivers 3 to converge and assume a side-by-side position in a single plane to form the sliver assembly. As the sliver assembly exits from the device 2, it enters the withdrawing rollers (only the withdrawing roller 5 is shown for clarity), after which the sliver assembly is dissolved as the individual slivers 3 assume a divergent course as shown at 3' in FIG. 1a. In the downstream zone of the sliver guiding device 2 the pivotal sensor element 22 is arranged which, together with the facing counterelement 34 forms the constriction 23 for the sliver assembly. The change in position of the sensor element 22 caused by a thickness variation of the sliver assembly applies mechanical signals to a transducer 33 which, accordingly, emits electric control pulses.

The counterelement 34 is pivotal in the direction of the arrows A, B about the axis of a rotary bearing (pivot pin) 36 parallel to the plane in which the slivers 3 are arranged side-by-side. The rotary bearing 36 is situated at the outlet end of the guide wall 2c. The counterelement 34 may be adjusted and immobilized in the adjusted position, for example, by a setscrew 35 having a stem 37 engaging the counterelement 34 at a location spaced from the pivot pin 36. The setscrew 35 is held in a support bracket 35'. The support bracket 35' and the rotary bearing 36 are secured in threaded bores 42 in a base plate 40 by means of screws 41a, 41b, which may be relocated into other, selected bores 42. The sensor element 22 and the counterelement 34 project through the lateral walls 2b and 2c. By means of the setscrew 35 the counterelement 34 is rotated about the rotary axis 36, for example, when the processed sliver type is changed (the drawing frame is inoperative during such changing operation), so that the width of the constriction 23 defined by the counterelement 34 and the sensor element 22 is changed from the distance a shown in FIG. 5. At the same time, the angle between the wall 2c and the counterelement 34 is also changed. The sensor element 22 biased by the spring 32 engaging the lever arm 31a of the sensor element 22 reacts to all changes of thicknesses of the throughgoing slivers 3, as a result of which the distance between the sliver engaging lever arm 31b of the sensor element 22 and the finely adjusted counterelement 34 varies as a function of the thickness fluctuations.

Figure 6:
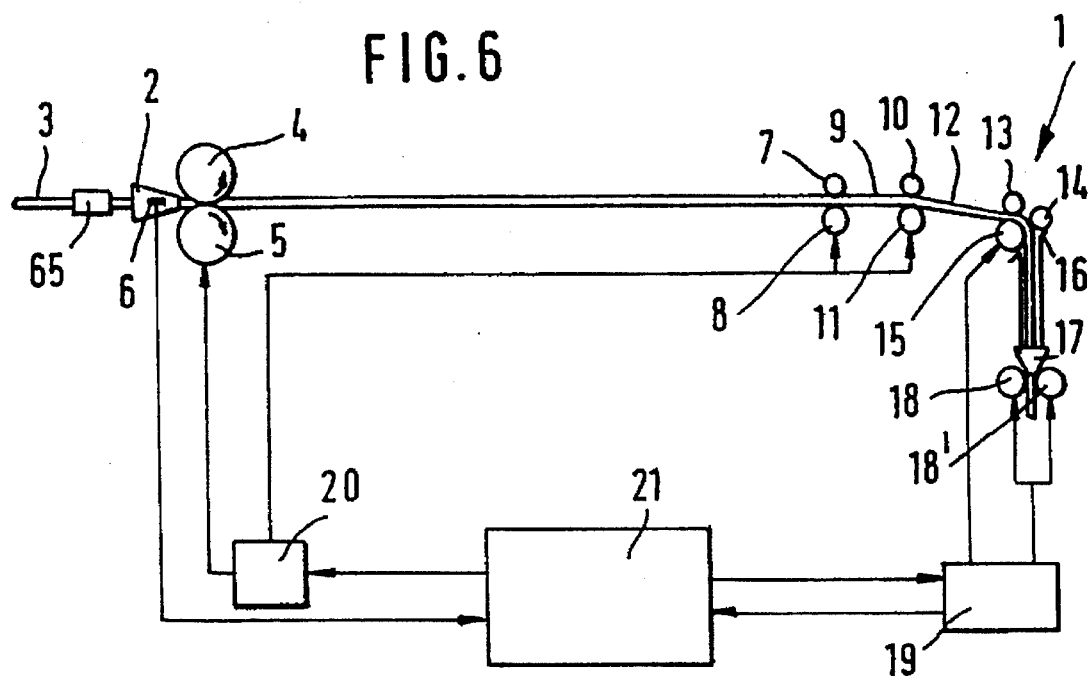
FIG. 6 is a schematic side elevational view, with block diagram, of a regulated drawing frame, incorporating the invention.

FIG. 6 illustrates a high production drawing frame 1 which may be, for example, an HS 900 model, manufactured by Trützschler GmbH & Co. KG, Mönchengladbach, Germany. A plurality of slivers 3, paid out from non-illustrated coiler cans, simultaneously enter the preformer 65 and are then introduced into the sliver guiding device 2, through which they are drawn and further advanced by the withdrawing rollers 4 and 5. In their travel through the sliver guiding device, the slivers 3 move past a measuring unit 6 which includes the sensor element 22. The drawing frame 1 includes an upper inlet roller 7 and a lower inlet roller 8 which are associated with the pre-drawing zone 9 delimited at the downstream end by the upper predrawing roller 10 and the lower predrawing roller 11. Between the roller pair 10, 11 as well as a roller pair formed of the upper main drawing roller 13 and the lower main drawing roller 15 the main drawing zone 12 extends. The lower main drawing roller 15 is associated with a second upper main drawing roller 14. Such an arrangement is referred to as a four over three drawing system.

The drafted slivers 3, after passing through the roller pair 14, 15, reach the inlet of a sliver guide 16 and are drawn through a sliver trumpet 17 arranged at the downstream end of the sliver guide 16 by cooperating delivery rolls 18, 18'.

In the sliver trumpet 17 the slivers are combined into a single sliver deposited into a non-illustrated coiler can. The main drawing rollers 13, 14, 15 and the delivery rollers 18, 18' are driven by a main motor 19 controlled by a computer 21. The signals generated by the measuring member 6 at the sliver guiding device 2 are applied to the computer 21 and are converted into control signals which are applied to a regulating motor 20 driving the withdrawing rollers 4, 5 as well as the rollers 7, 8, 10 and 11 of the pre-drawing zone 9. According to the signals of the measuring unit 6, representing the fluctuating thickness values of the sliver assembly formed of the slivers 3, the computer 21 sends control signals to the regulating motor 20 which accordingly varies the rpm's of the rollers 4, 5, 7, 8, 10 and 11.

It will be understood that the above description of the present invention is susceptible to various modifications, changes and adaptations, and the same are intended to be comprehended within the meaning and range of equivalents of the appended claims.

What is claimed is:

1. An apparatus for measuring sliver thickness in a drawing frame, comprising
   (a) a sliver guiding device including
      (1) an inlet for simultaneously receiving a plurality of side-by-side running slivers having an advancing direction;
      (2) sliver combining means defining a plane extending parallel to said advancing direction for bringing the slivers together to form a sliver assembly constituted by a plurality of side-by-side positioned running slivers arranged in said plane and laterally contacting one another; the sliver assembly having oppositely located first nd second outermost slivers; said sliver combining means comprising oppositely located, converging wall surfaces forming a cross-sectionally closed space;
      (3) an outlet for discharging the sliver assembly from said sliver guiding device;
   (b) a sensor element contacting said first outermost sliver at said outlet;
   (c) positioning means for movably supporting said sensor element;
   (d) a counterelement contacting said second outermost sliver at said outlet;
   (e) biasing means for urging said sensor element into a resilient contact with said first outermost sliver in a direction towards said second outermost sliver, whereby said sensor element undergoes excursions upon variation of thickness of said sliver assembly in said plane; said sensor element and said counterelement together defining a restriction through which said sliver assembly passes; said sensor element and said counterelement forming part of said combining means;
   (f) transducer means for converting excursions of said sensor element into electric pulses;
   (g) a preformer adjoining said sliver guiding device upstream thereof for causing the slivers to laterally approach one another prior to entering said sliver guiding device from said preformer; said preformer having opposite lateral sides, a top side and a bottom side; said lateral sides being formed by wall components converging in the sliver advancing direction; at least one of said top and bottom sides being open;
   (h) a withdrawing roller pair supported downstream of said sliver guiding device as viewed in said advancing direction; said withdrawing roller pair defining a nip through which the sliver assembly passes; and
   (i) means for driving said withdrawing roller pair for pulling the slivers through said preformer and said sliver guiding device.

2. The apparatus as defined in claim 1, wherein said wall components of said lateral sides are curved convexly towards one another.

3. The apparatus as defined in claim 1, further comprising adjusting means for varying a distance between said wall components.

4. The apparatus as defined in claim 1, wherein said preformer includes a sliver outlet having a first width; said inlet of said sliver guiding device having a second width measured parallel to said first width; said first width being smaller than said second width.

5. The apparatus as defined in claim 3, wherein said adjusting means comprises a pivot supporting one of said wall components for a pivotal motion towards and away from the other of said wall components; further comprising a base supporting said pivot.

6. The apparatus as defined in claim 5, wherein said pivot comprises a setting pin received in a recess of said base for immobilizing said one wall component in a desired angular position.

7. The apparatus as defined in claim 6, wherein said recess and said setting pin are threaded and further wherein said setting pin is threadedly received in said recess.

8. The apparatus as defined in claim 6, further comprising means for relocating said setting pin.

9. The apparatus as defined in claim 8, wherein said means for relocating said setting pin includes a plurality of spaced recesses provided in said base; said setting pin being received in a selected said recess.

10. The apparatus as defined in claim 5, wherein said pivot divides said one wall component into two arms; further comprising a setscrew supported on said base and engaging one of said arms.

* * * * *